US010762475B2

(12) United States Patent
Song et al.

(10) Patent No.: US 10,762,475 B2
(45) Date of Patent: Sep. 1, 2020

(54) DIGITAL TWINS FOR ENERGY EFFICIENT ASSET MAINTENANCE

(71) Applicant: Siemens Corporation, Iselin, NJ (US)

(72) Inventors: Zhen Song, Plainsboro, NJ (US); Arquimedes Martinez Canedo, Plainsboro, NJ (US)

(73) Assignee: Siemens Schweiz AG, Zurich (CH)

( * ) Notice: Subject to any disclaimer, the term of this patent is extended or adjusted under 35 U.S.C. 154(b) by 657 days.

(21) Appl. No.: 15/052,992

(22) Filed: Feb. 25, 2016

(65) Prior Publication Data

US 2016/0247129 A1 Aug. 25, 2016

Related U.S. Application Data

(60) Provisional application No. 62/120,399, filed on Feb. 25, 2015.

(51) Int. Cl.
G06Q 10/00 (2012.01)
G06Q 10/06 (2012.01)

(52) U.S. Cl.
CPC .......... G06Q 10/20 (2013.01); G06Q 10/067 (2013.01)

(58) Field of Classification Search
CPC .. G06Q 10/20; G06Q 10/067; G06F 17/5009; G06F 17/5018
USPC .......................................................... 703/7
See application file for complete search history.

(56) References Cited

U.S. PATENT DOCUMENTS

| 7,581,434 B1* | 9/2009 | Discenzo | G01N 33/2888 73/53.01 |
| 2008/0300888 A1* | 12/2008 | Dell'Anno | G06Q 30/02 705/1.1 |
| 2009/0083019 A1* | 3/2009 | Nasle | G06F 17/509 703/18 |
| 2014/0280142 A1* | 9/2014 | Wasson | G06F 16/2465 707/737 |
| 2016/0188675 A1* | 6/2016 | Vossler | G06F 16/2465 707/776 |

OTHER PUBLICATIONS

Tuegel, Eric J., et al. "Reengineering aircraft structural life prediction using a digital twin." International Journal of Aerospace Engineering 2011 (2011). pp. 1-14.*
Liang, Jian, and Ruxu Du. "Model-based fault detection and diagnosis of HVAC systems using support vector machine method." International Journal of refrigeration 30.6 (2007). pp. 1104-1114.*

(Continued)

Primary Examiner — Kamini S Shah
Assistant Examiner — John E Johansen

(57) ABSTRACT

A system for using digital twins for scalable, model-based machine predictive maintenance comprises a plurality of digital twins and a simulation platform. The plurality of digital twins correspond to plurality of remotely located physical machines. Each respective digital twin comprises: product nameplate data corresponding to a unique physical machine, one or more simulation models, and a database comprising run time log data collected from sensors associated with the unique physical machine. The simulation platform is configured to process simulation models corresponding to the plurality of digital twins using a plurality of multiprocessor computer systems.

16 Claims, 11 Drawing Sheets

(56) References Cited

OTHER PUBLICATIONS

Chen, Lei, Mitchell Tseng, and Xiang Lian. "Development of foundation models for Internet of Things." Frontiers of Computer Science in China 4.3 (2010). pp. 376-385. (Year: 2010).*

Tuegel, Eric J., et al. "Reengineering aircraft structural life prediction using a digital twin." International Journal of Aerospace Engineering 2011 (2011). pp. 1-14. (Year: 2011).*

\* cited by examiner

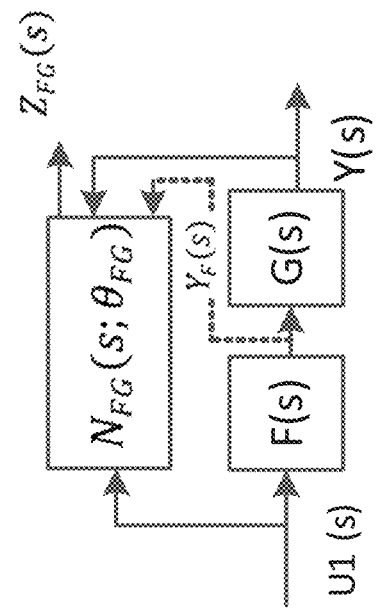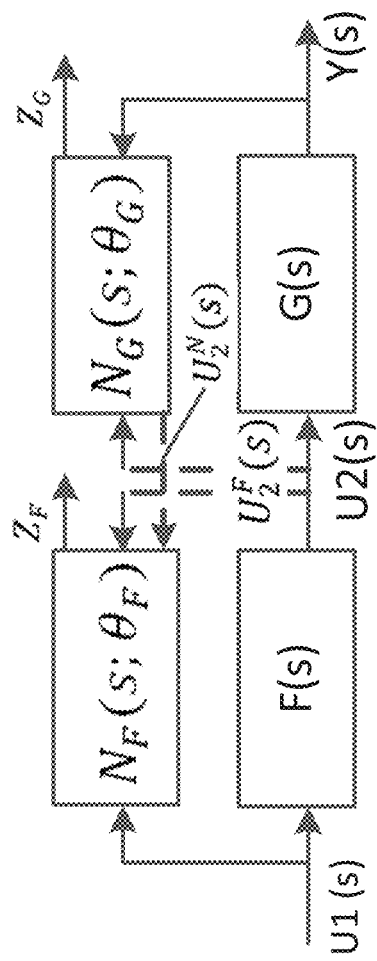
Fig. 8

DIGITAL TWINS FOR ENERGY EFFICIENT ASSET MAINTENANCE

CROSS-REFERENCE TO RELATED APPLICATIONS

This application claims the benefit of U.S. Provisional Application Ser. No. 62/120,399 filed Feb. 25, 2015, which is incorporated herein by reference in its entirety.

TECHNICAL FIELD

The present disclosure generally relates to systems, methods, and apparatuses for creating and utilizing digital twins for energy efficient asset maintenance. The techniques described herein may be applied, for example, to maintain HVAC and factory energy assets using a computer-based approached.

BACKGROUND

Typical heating, ventilation, and air conditioning (HVAC) machines require annual or semi-annual checking in order to ensure that they continue to operate efficiency. In traditional reactive maintenance methods, field engineers fix problems after faults are detected. Due to the complexity of the system and other limitations, when the faults are found, the system energy performance is often already degraded from its normal level and significant energy has been wasted.

Today's common practice is "paper and pencil" based fixed schedule maintenance, which mainly relies on the experience of engineers responsible for maintaining the machines. Mechanic engineers often need to check and maintain the machines based on name plate (e.g., a sticker) on the surface of the equipment. The run time sensor data are trended from a control system, often stored in vendor-specific database. In theory, it is important to combine the name plate information and the historical trending data in order to estimate the wear and tear of a specific machine. However, in practice, field engineers often make decisions based on the limited information on the name plates and their experiences. Thus, engineers are operating on limited information which results in inefficiencies and imprecision in machine maintenance.

SUMMARY

Embodiments of the present invention address and overcome one or more of the above shortcomings and drawbacks, by providing methods, systems, and apparatuses related to the creation and use of digital twins (DT) for energy efficient asset maintenance. The DT technology described herein may be used, for example, to provide manufacturers with dynamic, structured data regarding machine operations using full product-life-cycle data repositories and simulation models. Using the DT paradigm, designers, manufacturers, and maintenance providers can interact with each other for better quality products and more effective maintenance results.

According to some embodiments, a system for using digital twins for scalable, model-based machine predictive maintenance comprises a plurality of digital twins and a simulation platform. The plurality of digital twins corresponds to a plurality of remotely located physical machines. Each respective digital twin comprises product nameplate data corresponding to a unique physical machine, one or more simulation models, and a database comprising run time log data collected from sensors associated with the unique physical machine. In some embodiments, each respective digital twin further comprises a multimedia database which is configured to store maintenance data associated with the unique physical machine and inspection data associated with the unique physical machine.

The simulation platform in the aforementioned system is configured to process simulation models corresponding to the plurality of digital twins using a plurality of multiprocessor computer systems. These simulation models may be implemented, for example, using a Bayesian filtering framework. In some embodiments, the simulation platform is configured to execute each respective simulation model using a plurality of simulation engines executing in parallel across a plurality of processors on the multiprocessor computer system. In some embodiments, the system further includes a data platform which is configured to process a plurality of data query tasks using the plurality of multiprocessor computer systems. This data platform may utilize techniques such as a map-reduce programming to process each of the plurality of data query tasks.

In some embodiments of the aforementioned system, each respective digital twin comprises a web service interface configured to facilitate communication between the respective digital twin and one or more remote devices. In these embodiments, the system may further include a mobile device interface configured to facilitate monitoring of the plurality of remotely located physical machines via the plurality of digital twins. The system may also include a sensor interface configured to facilitate transfer of the run time log data from plurality of physical machines to the plurality of digital twins. This run time log may be collected from plurality of physical machines to the plurality of digital twins in real-time or near real-time, or on a slower basis. In some embodiments, each respective digital twin is configured to calculate a domain-specific Condition Index (CI) value corresponding to conditions of the unique physical machine corresponding to the respective digital twin. The digital twins may use an observer block operation within their respective simulations to calculate the domain-specific CI value.

According to other embodiments, a computer-implemented method for using a digital twin for scalable machine maintenance of a remotely located digital twin includes a computer system generating a digital twin corresponding to a physical machine in a digital twin repository stored on the computer system by aggregating observer blocks of serial or parallel digital twin components. The digital twin may be based, for example, on one or more of a manual associated with the physical machine or a datasheet associated with the physical machine received from the physical machine's original equipment manufacturer. The computer system receives sensor data from the physical machine and stores that data in association with the digital twin. The computer system may then identify one or more required maintenance tasks for the physical machine and send a notification of the one or more required maintenance tasks to an operator device.

The aforementioned method may include additional features in different embodiments of the present invention. For example, in some embodiments, the aforementioned method further includes the computer system receiving maintenance results generated in response to performance of the one or more required maintenance tasks by a maintenance engineer and storing those maintenance results in association with the digital twin. Similarly, in some embodiments, inspection results generated in response to performance of an inspection of the physical machine may be received and stored in in association with the digital twin. In other embodiments, the method further includes executing the simulation model on the computer system using a plurality of simulation engines operating in parallel to identify the one or more required maintenance tasks.

According to other embodiments, a system for using a digital twin for scalable machine maintenance includes an embedded computing sensor co-located with a physical machine and a digital twin of the physical machine located at the data center. The embedded computing sensor is configured to collect monitoring data from the physical machine and transfer the monitoring data to a data center. The digital twin of the physical machine is configured to identify one or more required maintenance tasks for the physical machine based on the monitoring data, and send a notification of the one or more required maintenance tasks to an operator device.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 8 shows observer blocks which may be used in creating a simulation model used by DTs, according to some embodiments;

DETAILED DESCRIPTION

The following disclosure describes the present invention according to several embodiments directed at methods, systems, and apparatuses related to using digital twins (DTs) for energy efficient asset maintenance. The use of DTs, abstracts information relevant to machine maintenance from the underlying data and simulation model management infrastructure. This allows end users to perform machine maintenance more efficiently by having access to detailed information regarding past, current, and predicted machine operations. For example, industrial and commercial machines (e.g., HVAC systems) typically require annual or semi-annual checking in order to ensure their efficiency. In traditional reactive maintenance methods, field engineers fix problems after faults are detected. When the faults are found, the system energy performance often already degraded from the normal and significant energy has been wasted. However, using a DT architecture, machines can be checked automatically or manually on a much more frequent basis which, in turn, results in quicker fault detection. Additionally, the detailed information provided by each DT can form the basis for simulations which help develop predictive maintenance procedures based on how individual machines operate under real-world conditions.

Briefly, a DT is a digital version of a machine. Once created, the DT can be used to represent the machine in a digital representation of a real world system. The DT is created such that it is identical in form and behavior of the corresponding machine. Additionally, the DT may mirror the status of the machine within a greater system. For example, sensors may be placed on the machine to capture real-time (or near real-time) data from the physical object to relay it back to a remote DT. The DT can then make any changes necessary to maintain its correspondence to the physical twin.

Figure 1:
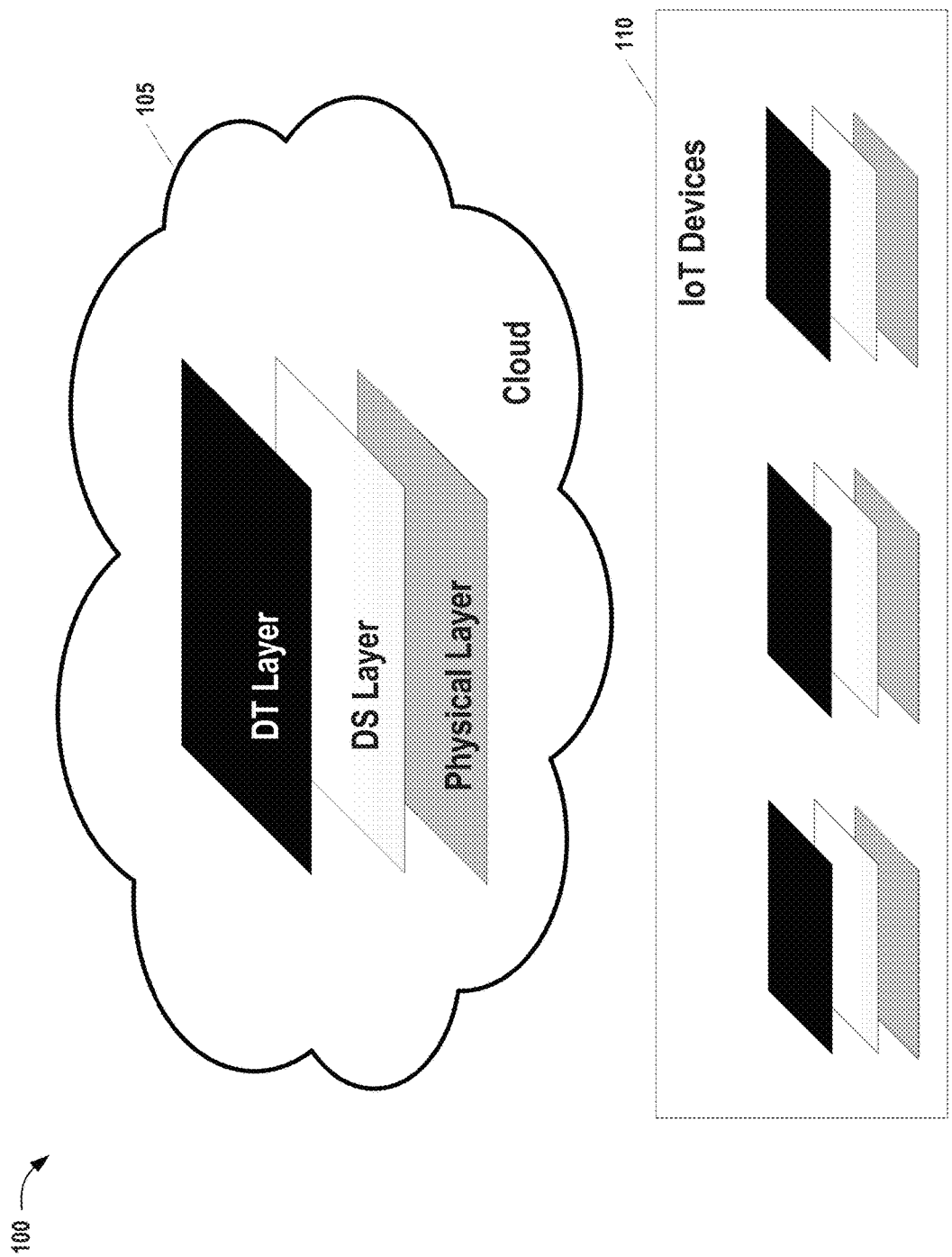
FIG. 1 illustrates a system implementing a three-layer DT architecture, as utilized in some embodiments of the present invention.

FIG. 1 illustrates a system 100 implementing a three-layer DT architecture, as utilized in some embodiments of the present invention. This system 100 is conceptually partitioned into device operating within Cloud 105 and Internet of Things (IoT) Devices 110. Here, Cloud 105 includes the DT software residing within a computer data center. The IoT Devices 110 may comprise, for example, single chip computers, smart phones, mobile devices, sensors, etc., capable of communicating with remote computers via the Hypertext Transfer Protocol (HTTP) protocols. The three-layer DT architecture implemented at Cloud 105 and Internet of Things (IoT) Devices 110 comprises a DT layer, a data and simulation (DS) layer, and a physical layer which represents the computation equipment utilized.

Figure 2:
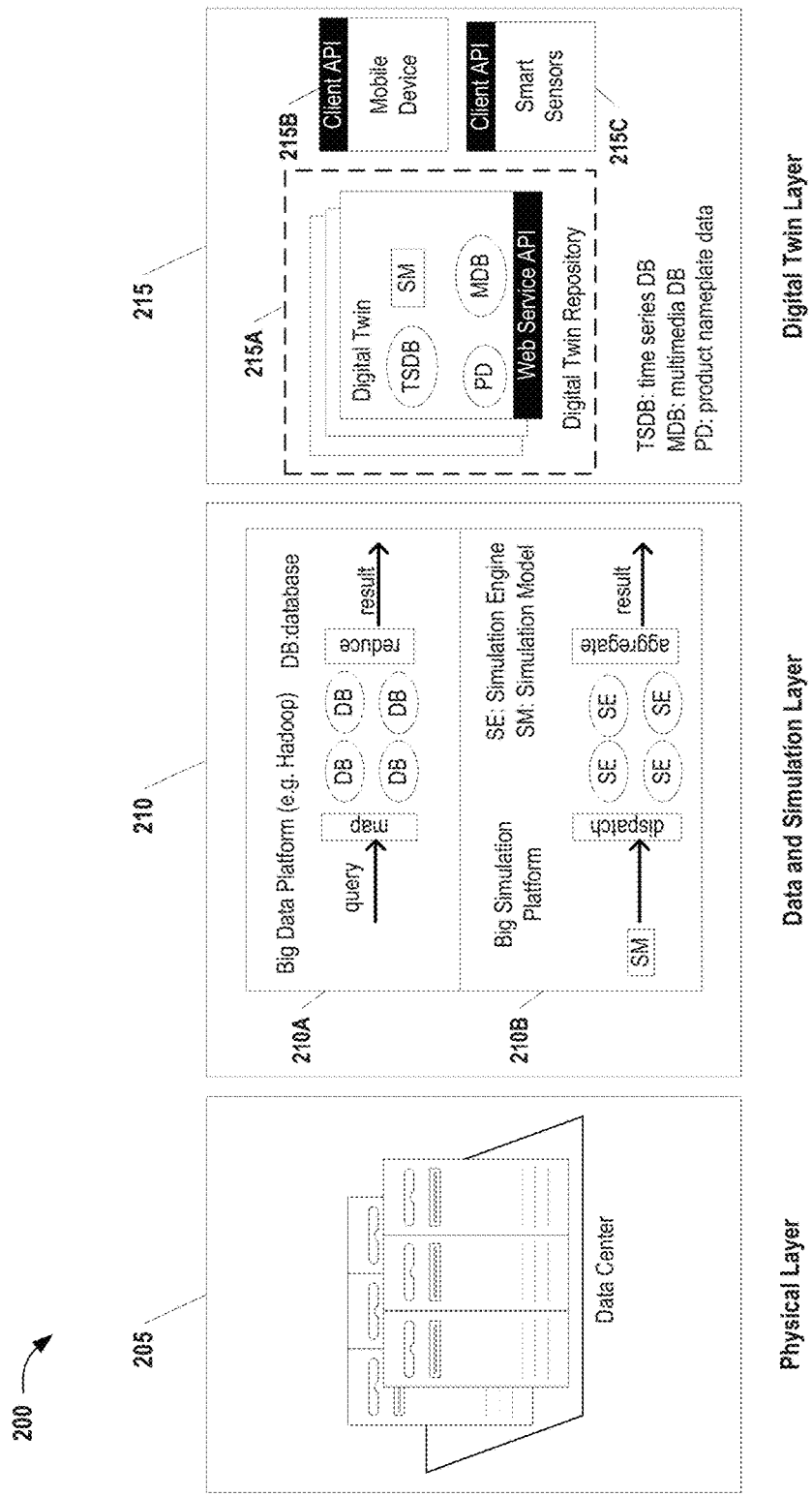
FIG. 2 provides a more detailed illustration of three-layer DT architecture shown in FIG. 1, as it may be implemented in some embodiments.

FIG. 2 provides a more detailed illustration 200 of the three-layer DT architecture shown in FIG. 1, as it may be implemented in some embodiments. The Physical layer 205 comprises a large number of computers and supporting equipment within a data center. The "big data platform" within the DS Layer refers to a parallel, distributed, and large scale NoSQL database infrastructure. In some embodiments, a customized database infrastructure may be developed specifically configured to DT-related demands. In other embodiments, a big data database infrastructure such as Hadoop or Bigtable may be employed.

In the example of FIG. 2, the Big Data Platform 210A provides "map-reduce" functionality, where the data query tasks are automatically dispatched to the proper computers within the data center at the physical layer 205. Additionally, query results may be automatically aggregated. The Big Simulation Platform 210B included at the DS Layer 210 provides a structure which is similar to that employed by the Big Data Platform 210A, except that simulation tasks are automatically dispatched to simulation engines and the results are automatically aggregated. It should be noted that that the aforementioned "model based" Bayesian filtering (also known as Bayesian inference), approach is considered as one class of simulation tasks.

At the DT Layer 215, a DT Repository (DTR) 215A hosts and manages numerous DTs. Each DT contains data as well as simulation models, where they are represented in ovals and rectangles, respectively, in FIG. 2. Each DT is associated with one and only one machine. The DT is comparable to the observer, in the sense any updates in the associated physical machine are recorded in the corresponding DT as well. Each DT comprises one or more databases which may store information such as the sensor data, inspection, and maintenance records, etc., associated with the corresponding physical device. In FIG. 2, TSDB stands for time series database, which stores the run time log data from sensors on the machine. For efficiency purposes, in some embodiments, time series data are stored in NoSQL database, not traditional SQL databases. PD and MDB stand for product nameplate data from the OEM and multimedia data from the inspector and maintenance engineers, respectively. They can be stored in SQL databases or in the aforementioned NoSQL database. The SM is the simulation model provided, for example, by Original Equipment Manufacturer (OEM) or control engineer.

The DT Layer 215 also includes two application program interfaces (API) for interfacing with the DTR 215A. A Mobile Device API 215B provides an interface for communicating with mobile devices such as computers, smart phones, and tablet devices. In some embodiments, the Mobile Device API 215B provides a web-based interface such that mobile devices can communicate with the DTR 215A using a web service. In other embodiments, the Mobile Device API 215B may provide a more specialized interface that offers features specific to a type of mobile device. The Smart Sensor API 215C provides an interface for sensors co-located with the machines being monitored (e.g., on, in, or near the machines). As with the Mobile Device API 215B, the Smart Sensor API 215C may be implemented using a generic interface (e.g., a simple web-based messaging system) or a more specialized interface may be customized to meet the monitoring demands of the DTR. For example, the Smart Sensor API 215C may be implemented to support a messaging protocol such as the User Datagram Protocol (UDP), Transmission Control Protocol (TCP), or HTTP.

Figure 3:
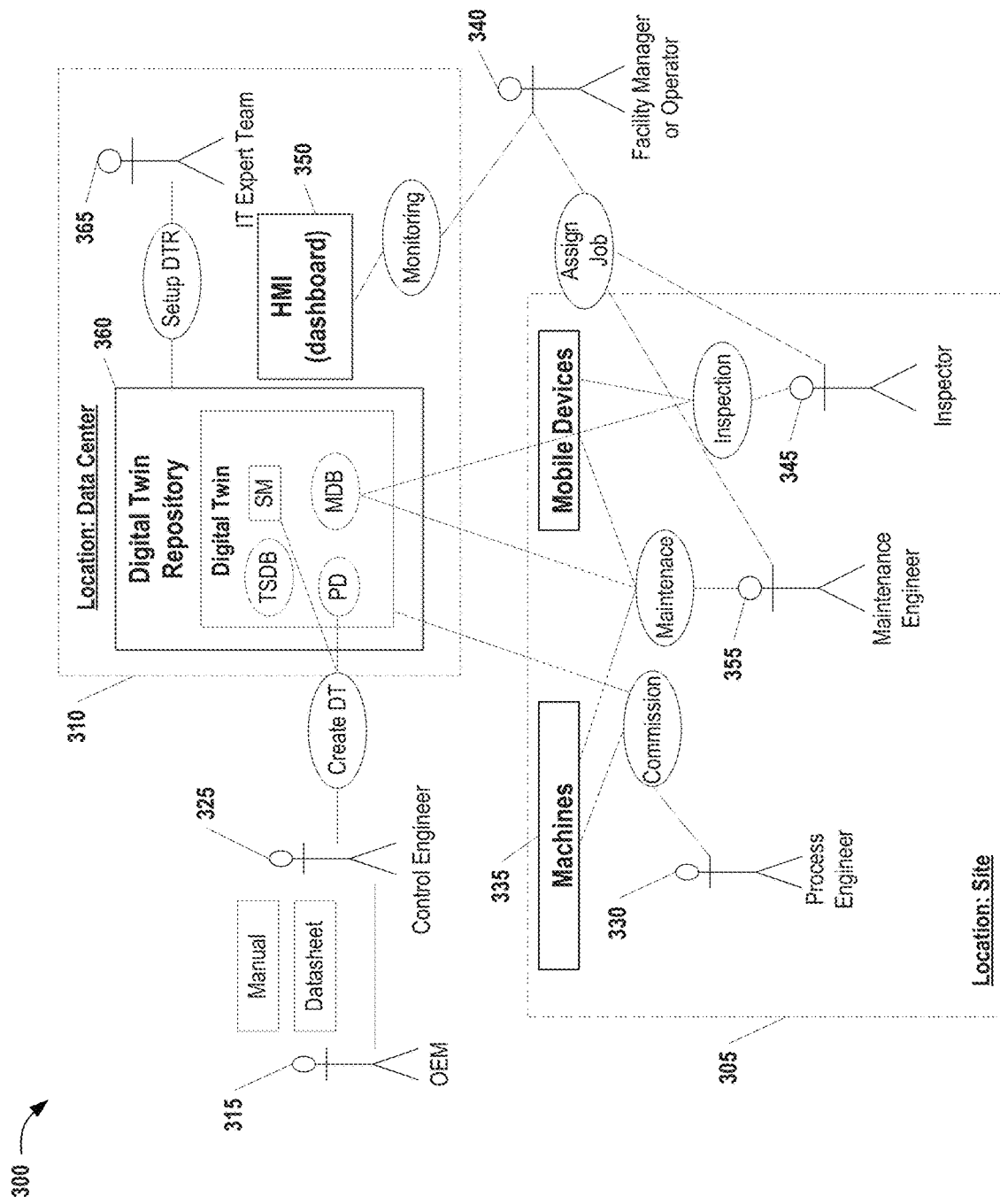
FIG. 3 provides a use case diagram 300 enabled by the DT architecture shown in FIGS. 1 and 2.

FIG. 3 provides a use case diagram 300 enabled by the DT architecture shown in FIGS. 1 and 2. This example illustrates the stakeholders, geolocations and key use cases associated with the architecture. Each use case is shown an oval block. There are two physical locations the Data Center 310 and the Site 305 where the Machines 335 is located. The stick figures represent the roles in the use case diagram, where one person may take multiple roles.

The OEM 315 are the manufactures of the Machines 335 at the Site 305. These manufactures can provide machine information such as the datasheet, user manual, etc., associated with the device. This information may be provided directly by the OEM 315 in electronic form or, alternatively, paper documents may be scanned (e.g., by Control Engineer 325) to generate the electronic versions. Various formats may be used for transfer the machine information including, without limitation, document-based formats such as the Portable Document Format (PDF) and more generic formats such as Extensible Markup Language (XML). In some embodiments, the OEM 315 may also provide simulation models which are used in creation of the DT (described below).

The Control Engineer 325 creates a DT and uploads it to the Data Center 310. Various techniques may be used for creating the DT based on information provided by the OEM 315. For example, in some embodiments, an Application Program Interface (API) is used to allow the Control Engineer 325 to create software programs for creating DT objects or data structures. These objects or data structures can be created locally and then uploaded to the Data Center 310 or, alternatively, the API may allow remote creation of the objects or data structures. In some embodiments, the Data Center 310 may provide a Graphical User Interface (GUI) which allows the Control Engineer 325 to input information into a form-like interface for uploading to the Data Center 310. The Data Center 310 can then use the uploaded information to create a DT. Additionally, if simulation models are not provided by the OEM 315, the Control Engineer 325 may build these models based on the information provided by the OEM 315 and additional data about how the machine corresponding to the DT will be utilized. An example of simulation generation using a Bayesian interference framework is described below.

At the Data Center 310, an IT Expert Team 365 is responsible for setup and maintenance of the DTR infrastructure. The IT Expert Team 365 may be composed of any combination of local or remote workers having access to the infrastructure of the Data Center 310. Process Engineer 330 commissions Machines 335 to the Site 305 and connects the Machines 335 with the associated DT objects in the DT Repository 360. Each of the Machines 335 comprises an IoT Device capable of communicating with the Data Center 310. After the commissioning, the Machines 335 are connected to the corresponding remote DTs and sensor data is periodically uploaded. In some embodiments, data uploads are performed in real-time or near-real time, while in other embodiments less frequent updates may be performed (e.g., hourly, weekly, etc.). Upload frequency may be based on factors such as the type of sensor information being collected or the hardware capabilities of a particular machine. For example, if a machine runs entirely on battery power, it may be desirable to limit uploads to maximize the life of the battery.

A Facility Manager and Operator 340 uses a Human Machine Interface (HMI) Dashboard 350 to locally or remotely monitor the Machines 335 at the Site 305 based on information provided by the DTs at the Data Center 310. The HMI Dashboard 350 provides detailed information related to the DTs managed in the DT Repository 360. Any technique generally known in the art may be used for generating the HMI Dashboard 350. For example, in some embodiments, the Facility Manager and Operator 340 utilizes a specialized app which collects and presents the relevant DT information on the Facility Manager and Operator's 340 mobile device. In other embodiments, the HMI Dashboard 350 may be accessed via a web browser on the Facility Manager and Operator's 340 desktop computer.

If faults are automatically detected by the HMI Dashboard 350 or observed manually by the Facility Manager and Operator 340, the Facility Manager and Operator 340 will assign inspection or maintenance jobs to the service team, including the inspector and the maintenance engineer. Once assigned inspection tasks, an Inspector 345 visits the Site 305 with a mobile device or other sensors. The Inspector 345 uses the mobile device (e.g., via the Mobile Device API 215B) to inspect the machine and the results of the inspection are uploaded to the corresponding DT in the DT Repository 360. Based on the results of the inspection, as presented via the HMI Dashboard 350, the Facility Manager and Operator 340 can assign a maintenance task to a Maintenance Engineer 355 at the Site 305. Similar to the Inspector 345, the Maintenance Engineer 355 collects information relevant to maintenance operations performed on the affected machines. This information is then sent to the DT Repository 360 for storage in the multimedia database of the corresponding DT.

In order to leverage the large scale computation resources available at the Data Center 310, a dynamic scheduling method is employed in some embodiments to schedule execution of the simulations included in each DT in the DT Repository 360. Model simulation with different configurations can be executed in parallel as they are independent tasks. To achieve it, a huge number of sequential simulation tasks can be distributed to be run simultaneously on the cloud that would provide unlimited computing resources.

In some embodiments, a master-worker framework is utilized to implement the dynamic scheduling of simulations at the Data Center 310 on a cloud-based platform (e.g., Amazon AWS cloud or Microsoft Azure). The process of launching a model simulation on such a platform generally comprises four steps. First, the user selects the appropriate instance type that meets the minimum resources requirements for the simulation and configures the instance with an appropriate simulation environment. This instance is used as a master instance. Second, using the master instance as an image, a certain number of worker instances are launched with the same configurations as the master. Third, the master instance is responsible for dividing the simulation tasks and making the most efficient scheduling to load tasks onto different worker instances. Finally, all the simulation results from the worker instances are sent back to the master instance, which then performs the final statistics and evaluation work on the results.

Figure 4:
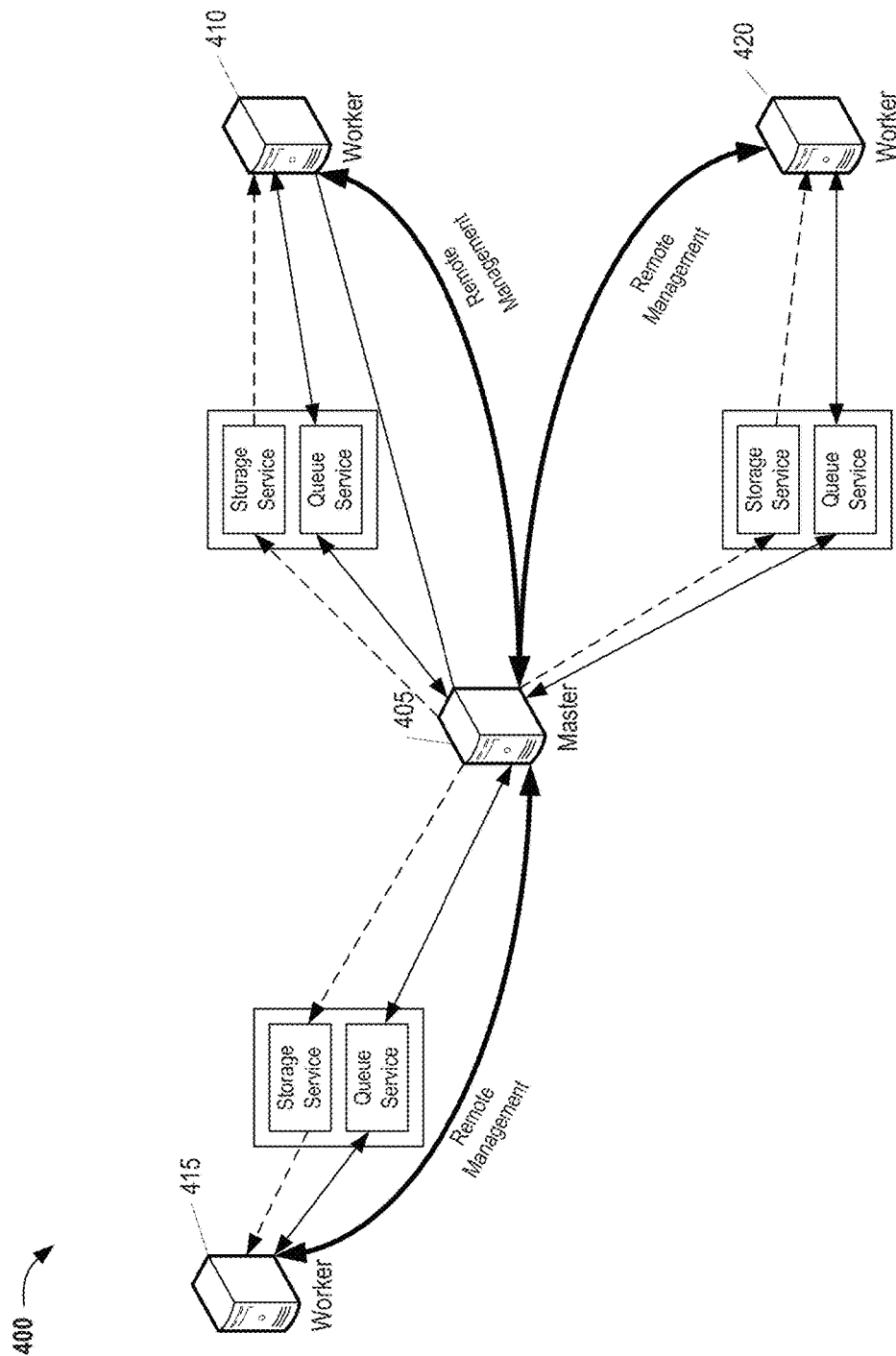
FIG. 4 shows an example communication mechanism between a Master Computer and a group of Work Computers implementing the aforementioned master-worker framework.

FIG. 4 shows an example communication mechanism 400 between a Master Computer 405 and a group of Work Computers 410, 415, 420 implementing the aforementioned master-worker framework. For each Work Computer 410, 415, 420, a special communication channel is constructed and reserved only for that worker. Each communication channel comprises two data caching services. A storage service is used to store the simulation model, while a queue service is used to store model configuration data. In some embodiments, rather than using two separate services the model and its configuration data may be stored together using a single service.

Continuing with reference to FIG. 4, the Master Computer 405 initially sends the model files and other dependent simulation files to storage service of each Work Computer 410, 415, 420. Then, according to an appropriate scheduling algorithm, the Master Computer 405 updates the queue service of each Work Computer 410, 415, 420 with model configuration data. Next, the Master Computer 405 builds a remote connection to each Work Computer 410, 415, 420 using a remote management service such as Windows Remote Management (WinRM). Using this connection, the Master Computer 405 sends commands to the Work Computers 410, 415, 420 to receive the model files from the storage service and configuration data from queue service.

Once each of the Work Computers 410, 415, 420 has been configured, the Master Computer 405 launches model simulation on the Work Computers 410, 415, 420. Each Work Computer 410, 415, 420 executes the simulation and sends back results to its corresponding storage service. The Master Computer 405 then collects all the simulation results from each Work Computer 410, 415, 420 through their storage service. Finally, the Master Computer 405 aggregates and evaluates the final results.

The amounts of minimal cloud computing resources needed for model simulation that satisfies user's needs should be calculated and allocated before launching model simulation. In the above section, we give a formula to calculate the minimum number of servers to achieve the goal of finishing model simulation within time $T_{ok}$. This is built based on the assumption that network delay time $t_2$ and model simulation time $t_3$ are fixed. But the fact is that model simulation time varies depending on both the complexity of model and the step size of simulation, the same model running under different configurations may cause the difference of step sizes, thus leading to change of actual simulation time. So $t_2$ and $t_3$ cannot be known in advance.

To guess the values for $t_2$ and $t_3$, we use the sampling method to get their approximate values. First, user can choose a sampling number m to set how many simple tests to perform. Second, sampling test on the data sending and receiving time between server and queue service for m times, and compute its average time. Third, randomly select m configurations among all set of possible configurations, and then run model simulations on these sampling configurations, and finally calculate the minimal/maximum/average simulation time. Thus, we can get approximate values for both $t_2$ and $t_3$ by sampling.

By sampling test on m model simulations, we would compute the model simulation time deviation, which will be used for optimization of scheduling method. Given a list of simulation time $\{t_1, t_2 \ldots t_m\}$, the standard deviation can be calculated with the formula:

$$\sigma = \sqrt{\frac{1}{m}\sum_{i=1}^{m}(t_i - \mu)}, \text{ where } \mu = \frac{t}{m}(t_1 + \ldots + t_m). \quad (1)$$

If $\sigma$ is close to 0, it means different model simulations take almost the same time, so it makes sense to give the same number of simulation tasks to each worker instance, which would be the best scheduling option. Otherwise, if $\sigma$ is big, then the above method will give bad performance as it will lead to some workers finishing jobs earlier than others. In this case, the dynamic scheduling method will be the best option.

According to the user specified simulation time $T_{ok}$, and guessed values of $t_2$ and $t_3$ by sampling, we can calculate the minimum number of instances to launch according to formula $N*(t_2+t_3)/T_{ok}$. To be safe, some embodiments, additional instances may be launched to guarantee or at least closely approach the satisfaction of the user specified time.

The ultimate goal of the scheduling strategy is to achieve the minimum simulation time and the maximum computer resource usage on the cloud, and task scheduling is the most critical part. With the same amount of cloud computing resources, it can perform as poor as a local machine if most of its available resources are in the idle state, and it can also perform like a super machine if computing resources are scheduled to cooperate efficiently and run in parallel. These are all depending on the scheduling algorithm.

In some embodiments, the DT framework discussed herein can be leveraged to calculate Condition Index (CI) of each machine being monitored. CI is a common measurement used in military asset management, as well as other domains. CI values for multiple assets at a particular site can be aggregated to calculate the inspection and maintenance schedule.

For different machines, different physical parameters may be used as the indicator of CI, which is a real number between 0% and 100%. Conceptually, all CI calculation methods can be captured in the observer diagram 500 in FIG. 5, where M is the real mechanic system; N is an algorithm called "observer;" U is the in input; Y is the output; and Z is either the CI or estimated Y. When Z is the estimated Y, the structure is also called Bayesian filter. Example Bayesian filters that may be employed using the techniques described herein include, without limitation, Kalman filters, Unscented Kalman filters, and particle filters.

For some devices, such as chillers, boilers, motors, etc., CI may be defined based on energy efficiency. For example, chiller part load ratio (PLR) may be defined as follows:

$$PLR = \frac{P_{cool}}{P_{cool\,capacity}} \quad (2)$$

Figure 6:
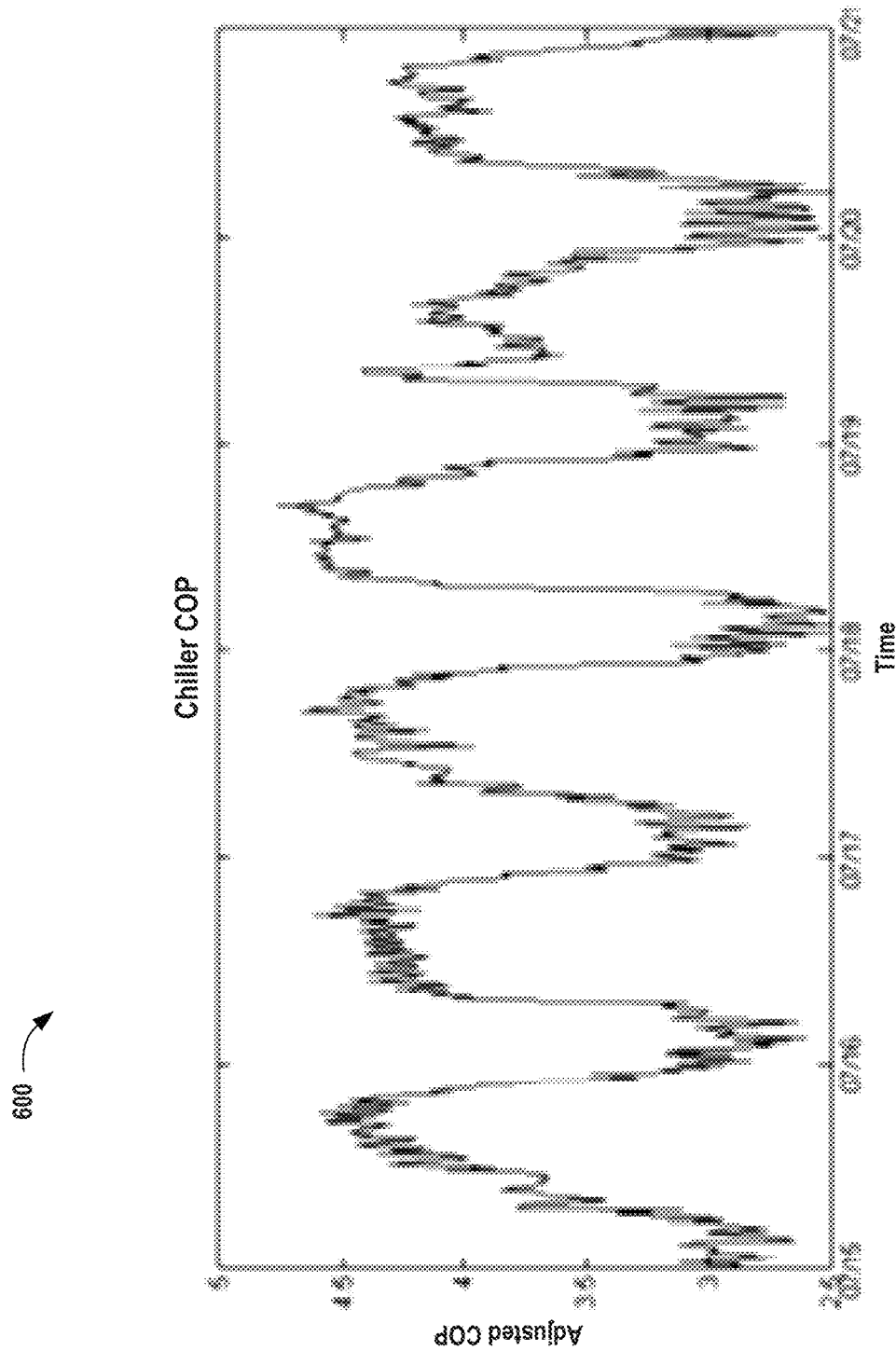
FIG. 6 shows a plot illustrating chiller Coefficient of Performance (COP) as a time varying function.
Figure 7:
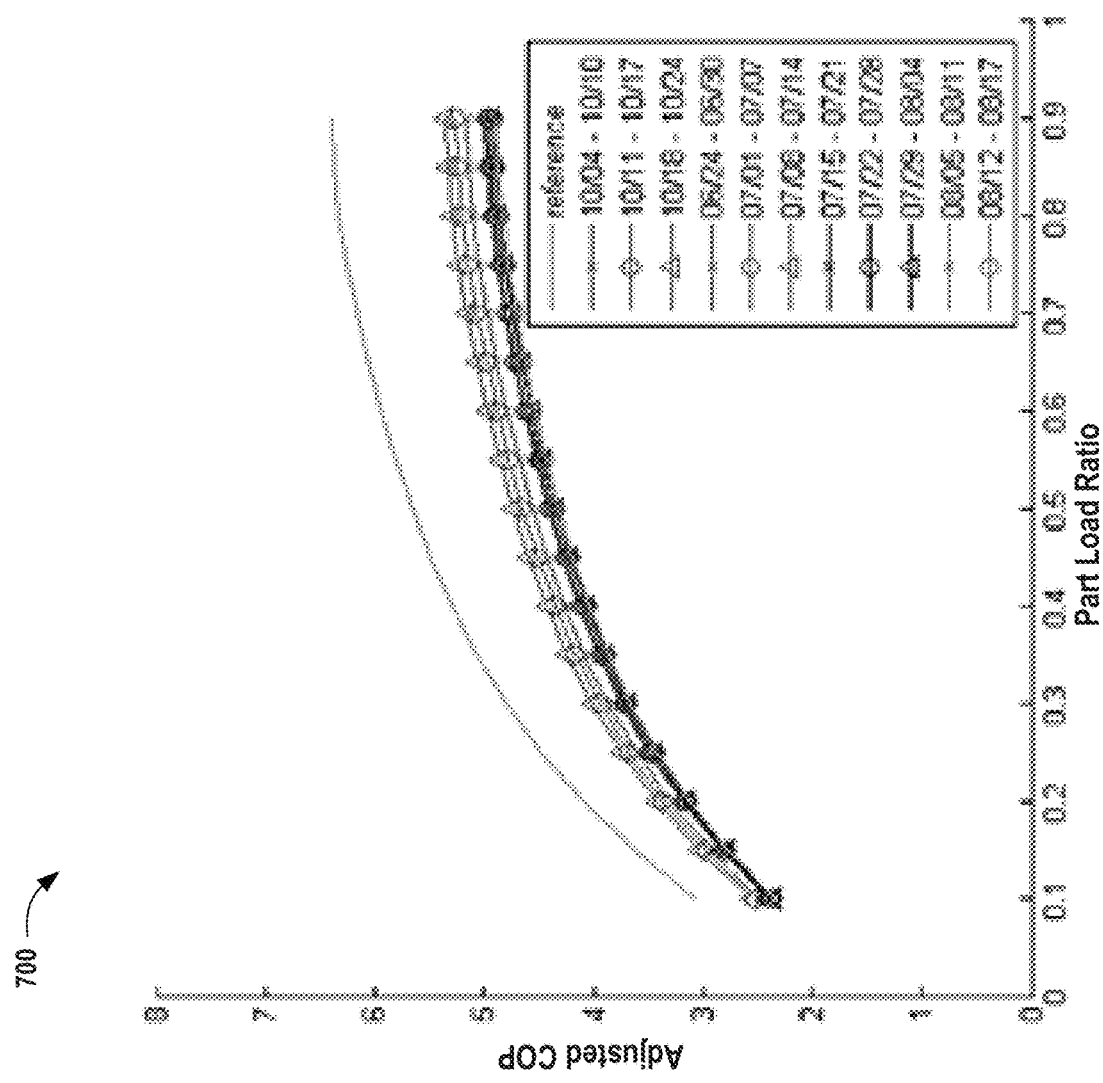
FIG. 7 shows another plot with curves representative of the chiller COP.

The value of $P_{cool}$ can be measured by the chilled water temperature and flow meter:

$$P_{cool} = \rho M (T_{CHWRT} - T_{CHWST}) \quad (3)$$

where, $\rho = 0.1465 \, \frac{KW}{GPM\,°F}$ is the specific heat of chilled water;

The $P_{coolcapcity}$ in this example is provided by the OEM. The Coefficient of Performance (COP) is defined as $$COP_{measure} = \frac{P_{cool}}{P}, \quad (4)$$

where P is measured by electric consumption. The chiller COP is a time varying function as shown in a plot 600 in FIG. 6. In FIG. 7, the x-axis is replaced by PLR, resulting in COP curves 700 that provide a reliable indicator of CI. The reference COP curve (the top curve in FIG. 7) is provided by the manufacture. In the chiller used in this example: one brand new chiller may have the following reference COP, $$COP_{ref} = f(PLR) = -10.91 PLR^i + 28.03 PLR^{3-29.67} PLR^2 + 17.27 PLR + 1.61 \quad (5)$$

The CI may then be defined as the degradation of the measured COP:

$$CI = \frac{COP_{measure}}{COP_{reference}} * 100\% \quad (6)$$

The traditional method is viable when three requirements are satisfied. Firstly, there must be sufficient device characteristics information provided by the OEM. Secondly, there must be sufficient sensor data acquired. For example, if there is no water flow meter to measure gallons per minute, $P_{cool}$ in Equation 2 cannot be calculated. Third, there must be a limited amount of sensor noise. If a physical quantity cannot be estimated directly, often it must be calculated directly from other sensors. This method is referred as "virtual sensor" in the HVAC domain. The precision of the virtual sensors may be subject to large uncertainties. Additionally, if physical sensors are installed, their precision can be significantly different. For instance, an ultrasonic flow meter is easy to install, but with much less accuracy than mechanic flow meters. The sensor error is not considered in the traditional CI calculation.

When the aforementioned requirements are not satisfied, the CI calculation may not be accurate for any maintenance planning. To address these concerns, the DT systems described herein may be used with model-based observer framework. This framework modifies the problem of CI calculation in two respects. First, the problem is converted into a probabilistic framework to enhance robustness of the COP calculation algorithm toward different uncertainties, such as sensor noise, insufficient sensors, or unknown characteristic curves. Secondly, the techniques described herein utilize automatic inference, instead of the traditional analytical approaches. The chiller CI calculation is conventionally solved with an analytical approach wherein engineers manually derive formulas to compute each variable. Since CI definitions are case by case, manually deriving the equations can be a labor intensive and error-prone. The proposed framework, instead, is designed for automatic inference by computers.

Deriving the analytical solution shown in Equation 7 from Equation 8 is not always easy, and sometimes not feasible. However, a uniform framework may be used to solve system equations in the probabilistic framework. Often, we know the conditional probability P(A|B), which is the probability of event A, if B happens. For instance, if the CI value is 70%, we know the sensor reading. That is called a priori probability. Bayes' formula computes the a posterior probability of P(B|A), $$P(B_j \mid A) = \frac{P(B_j \cap A)}{P(A)} = \frac{P(B_j \cap A)}{\sum P(A \mid B_i) P(B_j)} \quad (9)$$

For example, we can discretize the CI values such that $P(B_{85})$ is defined as the probability of CI equals 85%.

Figure 10:
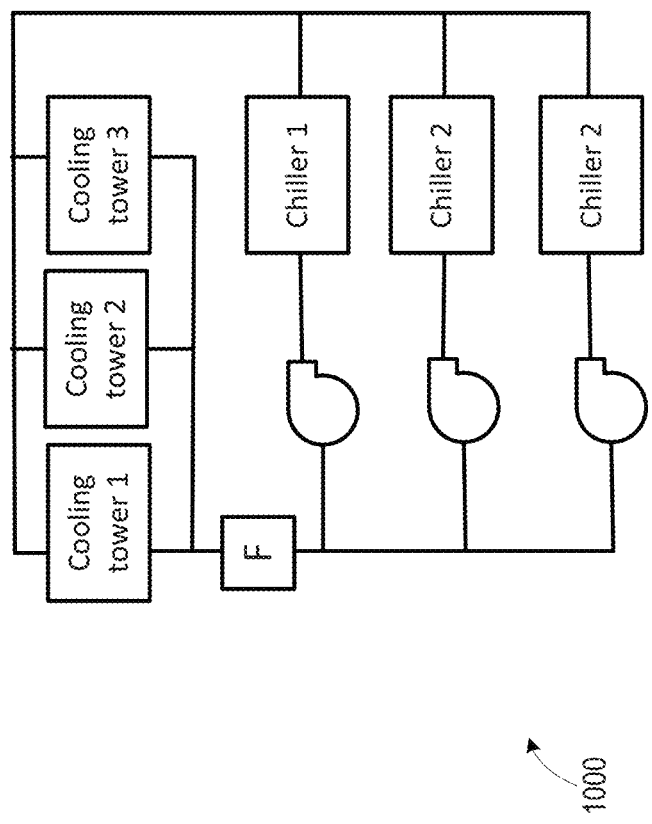
FIG. 10 shows an example condenser water pump piping system.

Extending the previous example, we assume there are three parallel chillers, yet one flow meter, as shown in FIG. 10. In FIG. 10, F represents the flow meter shared by all the chillers. The measurement of the flowmeter is M, such that $$M = \Sigma_i M^{(i)} \quad (11)$$

where $M^{(i)}$ is the amount of water provided to the i-th chiller. In this case M is known, but $M^{(i)}$ is unknown. The estimated condition index of the i-th chiller is $\widehat{CI}^{(i)}$, where $$\widehat{CI}^{(i)} = \frac{\widehat{COP}^{(i)}_{measure}}{COP_{reference}} \quad (12)$$

$COP_{reference}$, also called $COP_{ref}$, is curve provided by OEM.

When we consider $CI^{(i)}$ as a real number from 0 to 1, the probability distribution function (pdf) of $\widehat{CI}^{(i)}$ can be assumed as a normal distribution. The formulation is a continuous problem, i.e., $$P(CI^{(i)}) = 2\pi\sigma e^{-\frac{1}{2\sigma^2}(\widehat{CI}^{(i)} - CI^{(i)})^2} \quad (13)$$

$$CI^{(i)} \in [0, 1], CI^{(i)} \in R$$

The variable σ should come from OEM or measured by the control engineers using real data. It should be noted that there are many variations of this formulation which may alternatively be applied in some embodiments. We may also define $CI^{(i)}$ as an integer between 0 and 100, and we can describe the problem in a discrete formulation using cumulative distribution function (cdf). The continuous domain equations can be extended to the discrete domain easily.

$$\hat{COP}^{(i)}{}_{measure} = \frac{\hat{P}^{(i)}_{cool}}{P} \quad (14)$$

$$\hat{P}^{(i)}_{cool} = \rho \hat{M}^{(i)} (T^{(i)}_{CHWRT} - T^{(i)}_{CHWST})$$

The variable P is measured by the electricity meters. The expected total water flow is $\hat{M}$, as defined by:

$$\hat{M} = \Sigma_i \hat{M}^{(i)} \quad (15)$$

Ideally, the expected $\hat{M}$ shall be the same as the M measure by the flowmeter F. In reality, there are discrepancies between the values. We need to improve the estimate of $\widehat{CI}^{(i)}$ based on the discrepancy.

From the aforementioned equations, for any given $CI^{(i)}$, we can calculate the probability corresponding pdf of M, i.e., P(M). One method to calculate the value is using particle filter with a simulation based method. Then we have conditional probability, computed by the simulation model in the digital twin.

$$P(M|CI^{(i)}) = f_s(CI^{(i)}; i \in [1,N]) \quad (16)$$

Where $f_s( )$ is the simulation model; N is the number of chillers, i.e., 3 in this example. Our target is to calculate the most likely $\widehat{CI}^{(i)}$, $P(\widehat{CI}^{(i)}|M)$. According the Bayes theorem:

$$P(\widehat{CI}^{(i)}|M) = \frac{P(M|\widehat{CI}^{(i)})P(\widehat{CI}^{(i)})}{P(M)} \quad (17)$$

Where P(M) is the sensor measurement pdf, available from the flow meter OEM. With accurate sensors, the function P(M) is a narrow band normal distribution.

Figure 5:
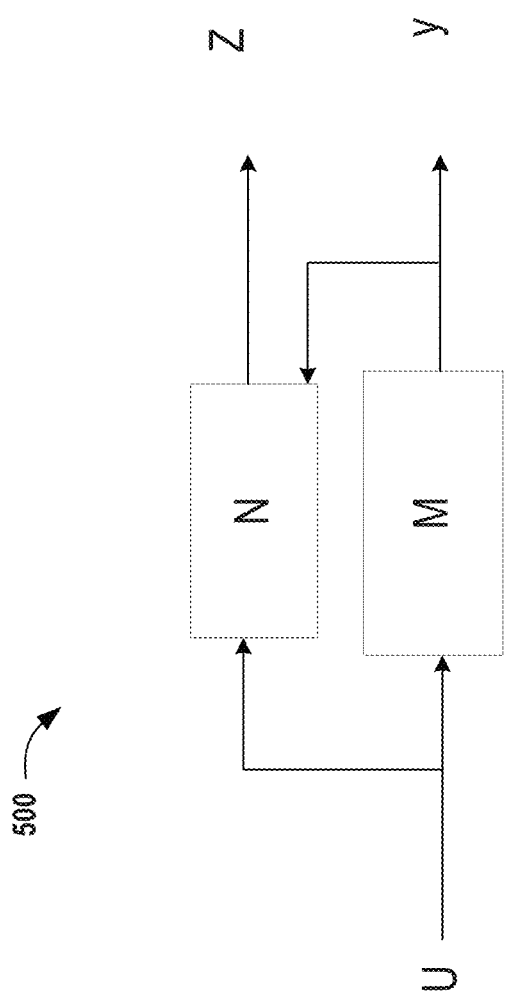
FIG. 5 illustrates observer diagram that may be used in DT creation, according to some embodiments.
Figure 9:
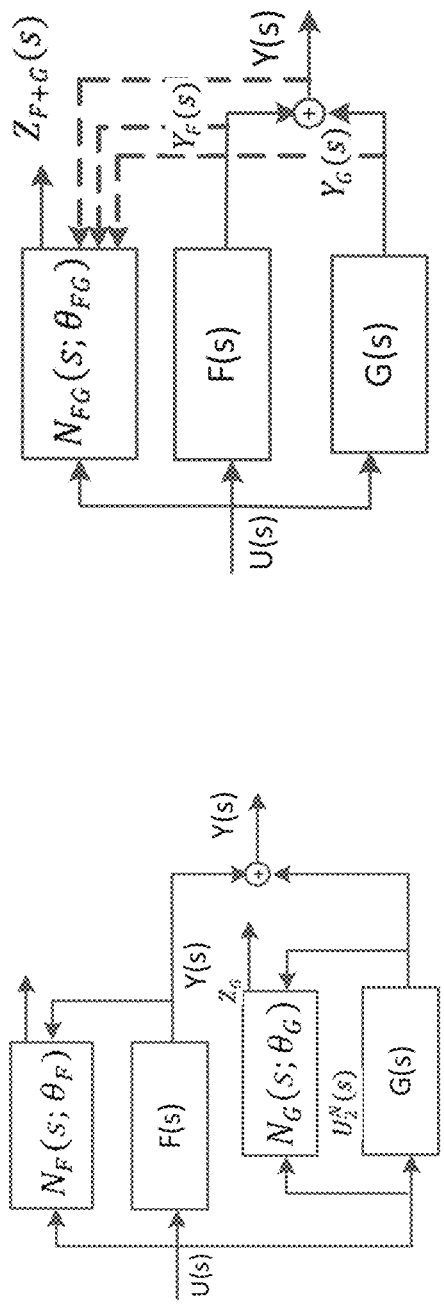
FIG. 9 shows observer blocks which may be used in creating a simulation model used by DTs, according to some embodiments.

The proposed digital twin methodology can be extended to any large scale system. In FIGS. 8 and 9, each machinery block has observer algorithm to calculate the CI value, in the same structure as shown in FIG. 5. In FIGS. 8 and 9, the dotted lines represent optional sensors, such as the flow meters in the chiller example. A serial observer operation example is shown in FIG. 8. Before the operation, the block F(s) is associated with observer $N_F(s; \theta_F)$, where $\theta_F$ is observed system parameter vector for block F(s). Similarly, block G(s) is associated with observer $N_G(s; \theta_G)$. If feasible, the output of F(s), i.e., $U_2^F(s)$, may be measured by sensor and feed to $N_F(s; \theta_F)$. If that sensor is not available, we have to estimate it from the block $N_G(s; \theta_G)$, where the signal is denoted as $U_2^N(s)$. The system estimate the CI of F(s) and G(s) independently, and the variables are $Z_F$ and $Z_G$. As shown on the right side of FIG. 8, after the operation, the observer is $N_{FG}(s; \theta_{FG})$, which generates the aggregated CI for the two blocks.

For the system on the left side of FIG. 8, the system function is F(s):

$$U_2^N(s) = F(s)U_1(s) \quad (18)$$

And the observer may be determined as follows:

$$Z_F(s) = N_F(U_1(s), U_2^F(s), U_2^N(s); \theta_F) \quad (19)$$

$Z_F(s)$ is the CI. In the diagram, the connections from $U_2^F(s)$ and $U_2^N(s)$ to $N_F$ are in dashed lines, which means these sensors are optional. The parameter $\theta_F$ is the internal parameters for $N_F$. If the hardware sensor is not installed, i.e., $U_2^F(s)$ is not available, then the observer $N_G(s)$ can provide an estimated value with a spread pdf function. The key benefit of the proposal Bayesian framework is its robustness toward limited sensors. There are a number of techniques generally known in the art to cope with limited sensors. Similarly, the observer $N_G(s)$ can be formulated as $$N_G(s) = N_G(U_2^F(s), Y(s); \theta_N) \quad (20)$$

The detailed computations of the observers are the similar to those chiller observer examples. On the right hand of the two observers merged into one observer $$Z_{FG} = N_{FG}(U_1(s), Y_F(s), Y(s); \theta_{FG}) \quad (21)$$

where $Y_F(s)$ is the optional sensor measurement between F(s) and G(s). In Equation 21, $\theta_{FG} = [\theta_F \; \theta_G]^T$. The serial CI aggregation function may be defined as follows:

$$Z_{FG} = g_s(Z_F, Z_G). \quad (22)$$

In FIG. 9, the blocks F(s) and G(s) are in parallel. Their observers are represented by $N_F(s; \theta_F)$. In this case, the blocks F(s) and G(s) are in parallel. Their observers are $N_F(s; \theta_F)$ and $N_G(s; \theta_F)$, respectively. Similarly, the aforementioned serial system, the parallel blocks can be formulated as $$Z_F = N_F(U(s), Y_F(s); \theta_F) \quad (23)$$

$$Z_G = N_G(U(s), Y_G(s); \theta_G)$$

$$Y(s) = Y_G(s) + Y_F(s)$$

Using Bayesian inference, the observers can be aggregated to $N_{FG}$, where $$Z_{F+G} = N_{FG}(Y(s), Y_F(s), Y_G(s); \theta_F) \quad (24)$$

The joint CI function may then be derived as follows:

$$Z_{F+G} = g_p(Z_F, Z_G) \quad (25)$$

With serial and parallel observer aggregation methods, users can design observers for complex systems by combining basic blocks. The observer in FIG. 8 and FIG. 9 are the essential simulation model (SM) referred in FIG. 2.

Figure 11:
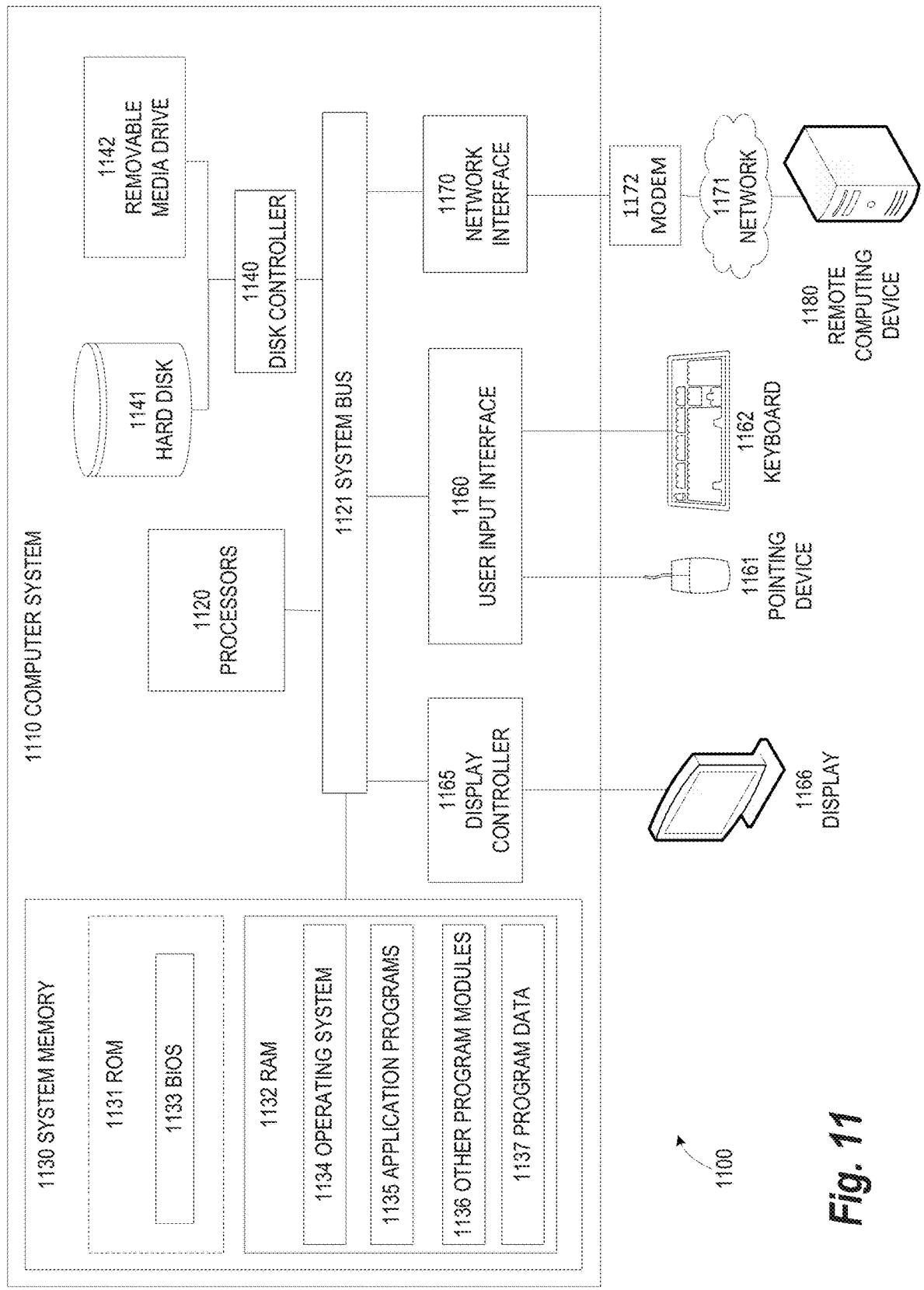
FIG. 11 illustrates an exemplary computing environment within which embodiments of the invention may be implemented.

FIG. 11 illustrates an exemplary computing environment 1100 within which embodiments of the invention may be implemented. In some embodiments, the computing environment 1100 may be used to implement one or more of the computer devices describe herein. For example, this computing environment 1100 may be used to implement one or more of the computing devices employed by the data center described above with reference to FIGS. 2 and 3. Computers and computing environments, such as computer system 1110 and computing environment 1100, are known to those of skill in the art and thus are described briefly here. It should be noted that, where the DTR is implemented in a cloud environment (i.e., in a data center) some of the items included in the exemplary computing environment 1100 (e.g., keyboard 1162) may not be applicable.

As shown in FIG. 11, the computer system 1110 may include a communication mechanism such as a bus 1121 or other communication mechanism for communicating information within the computer system 1110. The computer system 1110 further includes one or more processors 1120 coupled with the bus 1121 for processing the information. The processors 1120 may include one or more central processing units (CPUs), graphical processing units (GPUs), or any other processor known in the art.

The computer system 1110 also includes a system memory 1130 coupled to the bus 1121 for storing information and instructions to be executed by processors 1120. The system memory 1130 may include computer readable storage media in the form of volatile and/or nonvolatile memory, such as read only memory (ROM) 1131 and/or random access memory (RAM) 1132. The system memory RAM 1132 may include other dynamic storage device(s) (e.g., dynamic RAM, static RAM, and synchronous DRAM). The system memory ROM 1131 may include other static storage device(s) (e.g., programmable ROM, erasable PROM, and electrically erasable PROM). In addition, the system memory 1130 may be used for storing temporary variables or other intermediate information during the execution of instructions by the processors 1120. A basic input/output system (BIOS) 1133 containing the basic routines that helps to transfer information between elements within computer system 1110, such as during start-up, may be stored in ROM 1131. RAM 1132 may contain data and/or program modules that are immediately accessible to and/or presently being operated on by the processors 1120. System memory 1130 may additionally include, for example, operating system 1134, application programs 1135, other program modules 1136 and program data 1137.

The computer system 1110 also includes a disk controller 1140 coupled to the bus 1121 to control one or more storage devices for storing information and instructions, such as a hard disk 1141 and a removable media drive 1142 (e.g., floppy disk drive, compact disc drive, tape drive, and/or solid state drive). The storage devices may be added to the computer system 1110 using an appropriate device interface (e.g., a small computer system interface (SCSI), integrated device electronics (IDE), Universal Serial Bus (USB), or FireWire).

The computer system 1110 may also include a display controller 1165 coupled to the bus 1121 to control a display 1166, such as a cathode ray tube (CRT) or liquid crystal display (LCD), for displaying information to a computer user. The computer system includes an input interface 1160 and one or more input devices, such as a keyboard 1162 and a pointing device 1161, for interacting with a computer user and providing information to the processor 1120. The pointing device 1161, for example, may be a mouse, a trackball, or a pointing stick for communicating direction information and command selections to the processor 1120 and for controlling cursor movement on the display 1166. The display 1166 may provide a touch screen interface which allows input to supplement or replace the communication of direction information and command selections by the pointing device 1161.

The computer system 1110 may perform a portion or all of the processing steps of embodiments of the invention in response to the processors 1120 executing one or more sequences of one or more instructions contained in a memory, such as the system memory 1130. Such instructions may be read into the system memory 1130 from another computer readable medium, such as a hard disk 1141 or a removable media drive 1142. The hard disk 1141 may contain one or more datastores and data files used by embodiments of the present invention. Datastore contents and data files may be encrypted to improve security. The processors 1120 may also be employed in a multi-processing arrangement to execute the one or more sequences of instructions contained in system memory 1130. In alternative embodiments, hard-wired circuitry may be used in place of or in combination with software instructions. Thus, embodiments are not limited to any specific combination of hardware circuitry and software.

As stated above, the computer system 1110 may include at least one computer readable medium or memory for holding instructions programmed according to embodiments of the invention and for containing data structures, tables, records, or other data described herein. The term "computer readable medium" as used herein refers to any medium that participates in providing instructions to the processor 1120 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1141 or removable media drive 1142. Non-limiting examples of volatile media include dynamic memory, such as system memory 1130. Non-limiting examples of transmission media include coaxial cables, copper wire, and fiber optics, including the wires that make up the bus 1121. Transmission media may also take the form of acoustic or light waves, such as those generated during radio wave and infrared data communications.

The computing environment 1100 may further include the computer system 1110 operating in a networked environment using logical connections to one or more remote computers, such as remote computer 1180. Remote computer 1180 may be a personal computer (laptop or desktop), a mobile device, a server, a router, a network PC, a peer device or other common network node, and typically includes many or all of the elements described above relative to computer system 1110. When used in a networking environment, computer system 1110 may include modem 1172 for establishing communications over a network 1171, such as the Internet. Modem 1172 may be connected to bus 1121 via user network interface 1170, or via another appropriate mechanism.

Network 1171 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1110 and other computers (e.g., remote computer 1180). The network 1171 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1171.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 115 U.S.C. 112, sixth paragraph, unless the element is expressly recited using the phrase "means for."

The invention claimed is:

1. An automation system for using digital twins for scalable, model-based machine predictive maintenance, the automation system comprising:
a plurality of digital twins corresponding to plurality of remotely located physical machines; and
a simulation platform configured to process a plurality of simulation models corresponding to the plurality of digital twins using a plurality of multiprocessor computer systems, wherein each respective digital twin comprises:
product nameplate data corresponding to a unique physical machine of the plurality of remotely located physical machines,
one or more simulation models of the plurality of simulation models, the one or more simulation models corresponding to the unique physical machine, and
a database comprising run time log data collected from sensors associated with the unique physical machine,
wherein each respective digital twin is configured to:
calculate a domain-specific Condition Index (CI) value indicative of energy efficiency of the unique physical machine corresponding to the respective digital twin, wherein an observer block operation is configured within the one or more simulation models corresponding to the unique physical machine to calculate the domain-specific CI value, wherein the domain-specific CI value is calculated using a probabilistic framework based on automatic inference to account at least for sensor noise, insufficient hardware sensors, and unknown characteristic curves representative of performance of the unique physical machine over a period of time,
wherein the observer block operation configured within the one or more simulation models calculates the domain-specific CI value using a plurality of individual observer blocks connected serially, in parallel, or using a combination of serial and parallel connections,
wherein the observer block operation is configured to generate estimates based on for the insufficient hardware sensors, and the unknown characteristic curves,
identify one or more required maintenance tasks for the unique physical machine based on the calculated domain-specific CI value, and
send a notification of the one or more required maintenance tasks to an operator device.

2. The automation system of claim 1, further comprising:
a data platform configured to process a plurality of data query tasks using the plurality of multiprocessor computer systems.

3. The automation system of claim 2, wherein the data platform utilizes a map-reduce programming model to process each of the plurality of data query tasks.

4. The automation system of claim 1, wherein each simulation model included in the plurality of digital twins is implemented using a Bayesian filtering framework.

5. The automation system of claim 1, wherein each respective digital twin comprises a web service interface configured to facilitate communication between the respective digital twin and one or more remote devices.

6. The automation system of claim 5, wherein the system further comprises a mobile device interface configured to facilitate monitoring of the plurality of remotely located physical machines via the plurality of digital twins.

7. The automation system of claim 5, wherein the system further comprises a sensor interface configured to facilitate transfer of the run time log data from plurality of physical machines to the plurality of digital twins.

8. The automation system of claim 7, wherein the run time log data is collected from plurality of physical machines to the plurality of digital twins in real-time.

9. The automation system of claim 1, wherein each respective digital twin further comprises:

a multimedia database configured to store maintenance data associated with the unique physical machine and inspection data associated with the unique physical machine.

10. The automation system of claim 1, wherein the simulation platform is configured to execute each respective simulation model of the plurality of simulation models using a plurality of simulation engines executing in parallel across a plurality of processors on the plurality of multiprocessor computer systems.

11. A computer-implemented method for using a digital twin for scalable machine maintenance of a remotely located digital twin, the method comprising:
   generating, by a computer system, a digital twin corresponding to a physical machine in a digital twin repository stored on the computer system by aggregating observer blocks of serial or parallel digital twin components;
   receiving, by the computer system, sensor data from the physical machine;
   storing, by the computer system, the sensor data in association with the digital twin;
   identifying, by the computer system, one or more required maintenance tasks for the physical machine; and
   sending, by the computer system, a notification of the one or more required maintenance tasks to an operator device,
   wherein the digital twin comprises a simulation model to simulate operation of the physical machine based on the sensor data, wherein a simulated operation of the physical machine estimates energy efficiency of the physical machine,
   calculating a domain-specific Condition Index (CI) value indicative of energy efficiency of the physical machine corresponding to the respective digital twin, wherein an observer block operation is configured within the simulation model corresponding to the physical machine to calculate the domain-specific CI value, wherein the domain-specific CI value is calculated using a probabilistic framework based on automatic inference to account at least for sensor noise, insufficient hardware sensors, and unknown characteristic curves representative of performance of the unique physical machine over a period of time,
   wherein the observer block operation configured within the simulation model calculates the domain-specific CI value using a plurality of individual observer blocks connected serially, in parallel, or using a combination of serial and parallel connections,
   wherein the observer block operation is configured to generate estimates to account for the insufficient hardware sensors, and the unknown characteristic curves,
   wherein the one or more required maintenance tasks are identified for the physical machine based on the calculated domain-specific CI value of the physical machine.

12. The method of claim 11, wherein the digital twin is generated based on one or more of a manual associated with the physical machine or a datasheet associated with the physical machine received from the physical machine's original equipment manufacturer.

13. The method of claim 11, further comprising:
   receiving, by the computer system, maintenance results generated in response to performance of the one or more required maintenance tasks by a maintenance engineer; and
   storing, by the computer system, the maintenance results in association with the digital twin.

14. The method of claim 11, further comprising:
   receiving, by the computer system, inspection results generated in response to performance of an inspection of the physical machine; and
   storing, by the computer system, the inspection results in association with the digital twin.

15. The method of claim 11, further comprising:
   executing the simulation model on the computer system using a plurality of simulation engines operating in parallel to identify the one or more required maintenance tasks.

16. An automation system for using a digital twin for scalable machine maintenance, the system comprising:
   an embedded computing sensor co-located with a physical machine and configured to:
      collect monitoring data from the physical machine; and
      transfer the monitoring data to a data center; and
   a digital twin of the physical machine located at the data center and configured to:
      identify one or more required maintenance tasks for the physical machine based on the monitoring data, and
      send a notification of the one or more required maintenance tasks to an operator device,
      wherein the digital twin comprises a simulation model to simulate operation of the physical machine based on the monitoring data, wherein a simulated operation of the physical machine estimates energy efficiency of the physical machine,
   calculating a domain-specific Condition Index (CI) value indicative of energy efficiency of the physical machine corresponding to the respective digital twin, wherein an observer block operation is configured within the simulation model corresponding to the physical machine to calculate the domain-specific CI value,
   wherein the domain-specific CI value is calculated using a probabilistic framework based on automatic inference to account at least for sensor noise, insufficient hardware sensors, and unknown characteristic curves representative of performance of the unique physical machine over a period of time,
   wherein the calculated CI value is calculated using a probabilistic framework configured to account at least for sensor noise, insufficient hardware sensors, and unknown characteristic curves representative of performance of the physical machine over a period of time,
   wherein the observer block operation configured within the simulation model calculates the domain-specific CI value using a plurality of individual observer blocks connected serially, in parallel, or using a combination of serial and parallel connections,
   wherein the observer block operation is configured to generate estimates to account for the insufficient hardware sensors, and the unknown characteristic curves,
   wherein the one or more required maintenance tasks are identified for the physical machine based on the calculated domain-specific CI value of the physical machine.

* * * * *